K. RUSHTON.
DRIFTING VALVE.
APPLICATION FILED JAN. 5, 1915.

1,172,053.

Patented Feb. 15, 1916.

Witnesses:-
J. F. Woessner
Walter P. Pullinger

Inventor
Kenneth Rushton
by his Attorneys

THE COLUMBIA PLANOGRAPH CO., WASHINGTON, D. C.

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

DRIFTING-VALVE.

1,172,053.  Specification of Letters Patent.  Patented Feb. 15, 1916.

Application filed January 5, 1915. Serial No. 599.

*To all whom it may concern:*

Be it known that I, KENNETH RUSHTON, a citizen of the United States, residing in Philadelphia, Pennsylvania, have invented certain Improvements in Drifting-Valves, of which the following is a specification.

My invention relates to certain improvements in valves used in connection with the cylinders of locomotives for the purpose of breaking the vacuum formed at either end of the cylinder when the locomotive is drifting and the steam has been cut off.

One object of my invention is to construct an automatic drifting valve which will allow a certain proportion of steam to enter the end of the cylinder in which a slight vacuum is formed.

A further object of the invention is to provide an air valve, which is open to the atmosphere at one side and which will actuate a steam valve when a vacuum is formed, but which will be normally closed under steam pressure.

These objects I attain in the following manner, reference being had to the accompanying drawings, in which:—

Figure 1:
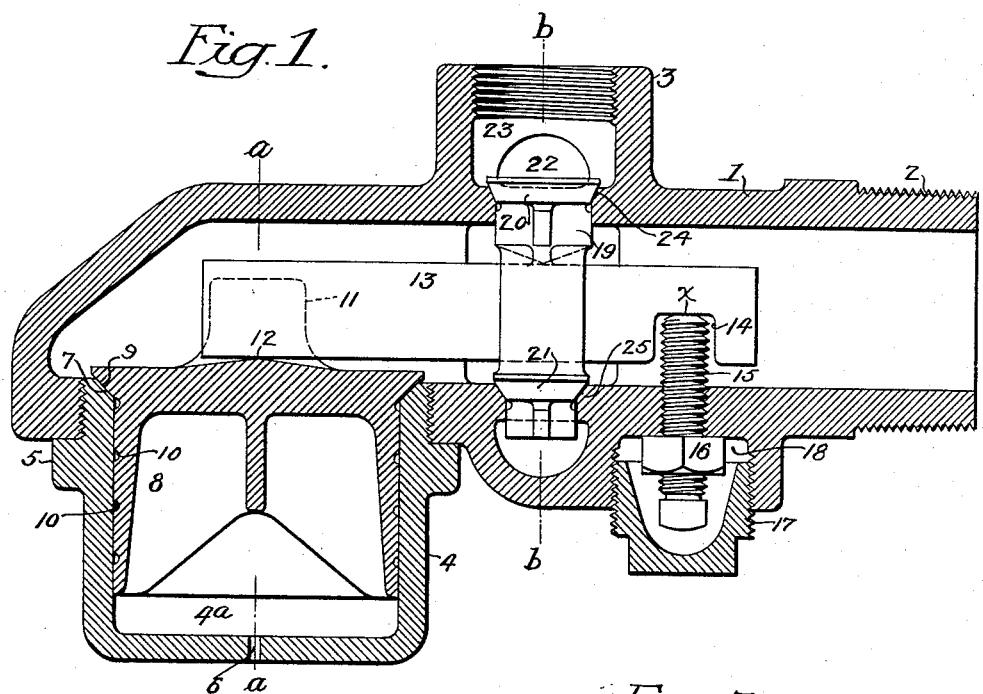
Figure 2:
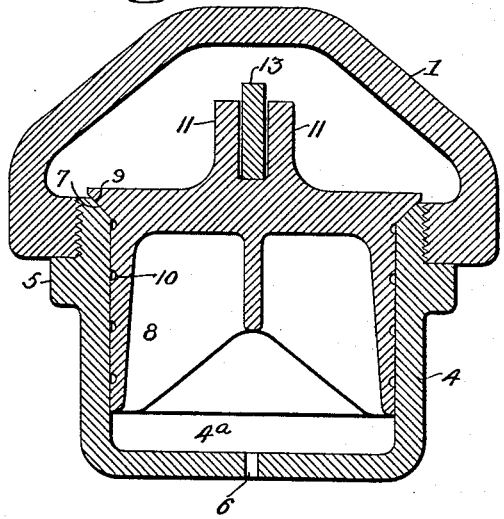
Figure 3:
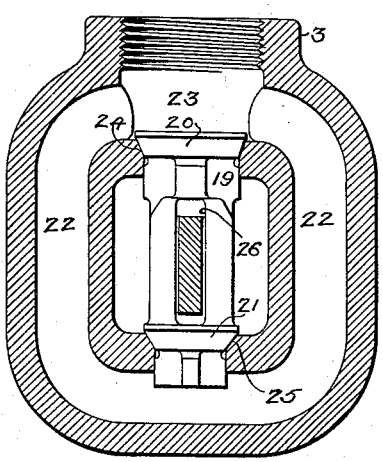

Figure 1, is a longitudinal sectional view of my improved drifting valve; Fig. 2, is a sectional view on the line a—a, Fig. 1; and Fig. 3, is a sectional view on the line b—b, Fig. 1.

Referring to the drawings, 1 is the valve casing having a threaded end 2, which is screwed into the steam passage of the cylinder and also has a threaded projection 3 to which is attached a steam supply pipe.

4 is an air valve casing having a portion screwed into an opening in the underside of the valve casing 1 and having a collar 5, which forms a tight joint and incloses the air chamber 4ª. In the bottom of this casing is an air vent 6 communicating with the chamber and at the upper end of the casing is a beveled seat 7. Mounted in the valve casing is a plunger valve 8 having a beveled flange 9 fitting, when in the closed position, on the beveled seat 7. The plunger valve 8 has a series of annular cavities 10 forming air traps and is hollow and has ribs, as shown. Projecting from the upper surface of the plunger valve 8 are two lugs 11 and located between the lugs and resting on a narrow seat 12 is a lever 13 notched at 14 and having its fulcrum $x$ on the end of a screw 15 adapted to a threaded opening in the casing. The lower end of this screw is provided with a head and this screw has a jam nut 16 so that the screw can be adjusted and can be locked in position after adjustment so as to raise or lower the fulcrum point. In order to inclose the screw and to prevent leakage of steam, I provide a screw plug 17 adapted to threads in the walls of the cavity 18 in which the head of the screw is mounted.

19 is a double steam valve having an upper beveled portion 20 and a lower beveled portion 21 and in the walls of the casing 1 is a steam passage 22 communicating with a port 23 in the projection 3. The casing 1 has an upper beveled seat 24 and a lower beveled seat 25 for the two beveled portions 20 and 21 respectively of the valve. The stem of the valve is slotted, as at 26, for the passage of the lever 13 and the upper end of the slot is beveled to provide a point of contact between the bar and the valve. The valve is arranged so as to have a limited vertical movement as the lever 13 is raised.

When the valve casing is located on the cylinder of the locomotive and the extension 3 is coupled to the live steam pipe, the steam valve is normally closed as the diameter of the upper surface of the steam valve is greater than the diameter of the lower surface which is subjected to the direct pressure of steam. When the main steam supply of the locomotive is cut off and the locomotive is drifting, a partial vacuum is formed first in one end of the cylinder and then in the other by the action of the piston and as a partial vacuum is formed it tends to lift the vavle 8, air being admitted through the passage 6 and this action raises the lever 13 on its fulcrum $x$ and the lever, in turn, forces the valve 19 off of its seat allowing a certain amount of steam to enter the valve casing 1 and through it to enter the cylinder on one side of the piston, breaking the vacuum. As soon as there is sufficient steam pressure the air valve 9 is automatically closed, due to its great diameter, and the steam valve is also closed, due to the pressure of steam in the port 23. The lever 13 can be adjusted by turning the screw 15 so as to take up wear, or for other purposes.

It will be noticed that the air opening 6 in the bottom of the air valve casing is comparatively small so that the plunger valve 8 will act slowly, both in the upward movement and also when it retakes its seat, preventing rattling. It will be noticed that there is one of these valves at each cylinder of the locomotive and while I have described the valve as coupled to a live steam pipe, it may be coupled to any pipe in which there is fluid under pressure.

I claim:—

1. The combination in a drifting valve, of a casing communicating with the steam passage of a cylinder and having a port communicating with fluid under pressure; a valve for closing the port to the interior of the casing; an air plunger; and a lever bearing upon the air plunger and arranged to actuate the valve when the plunger is raised so as to allow fluid under pressure to enter the casing and to break the vacuum in the cylinder.

2. The combination in a drifting valve, of a casing arranged to be coupled to the steam passage of a cylinder and having a port communicating with fluid under pressure and having a chamber communicating with the atmosphere; a valve closing the passage leading from the port for fluid under pressure and to the interior of the casing; an air plunger; and a lever bearing upon the air plunger and the fluid pressure valve so that when a partial vacuum is formed in the cylinder the plunger will be raised and will open the valve to allow fluid under pressure to enter the casing and the cylinder.

3. The combination in a drifting valve, of a casing arranged to be coupled to the steam passage of a cylinder and having a port communicating with fluid under pressure; a valve for closing the port so as to cut off communication between the port and the interior of the casing; an air plunger; an adjusting screw; and a lever resting on the adjusting screw as a fulcrum and bearing against the air plunger and controlling the fluid pressure valve so that when the air plunger is raised; due to the partial vacuum in the cylinder, the valve will also be raised to allow fluid under pressure to enter the casing and to break the vacuum in the cylinder.

4. The combination in a drifting valve, of a casing arranged to be connected to the steam passage of a cylinder and having a port for fluid under pressure; a passage extending around the casing from the port, the port and passage communicating with the interior of the valve casing at the upper and lower end; a valve seat surrounding each opening; a double valve arranged to close against both seats; an air plunger; a lever arranged to be actuated by the plunger and to actuate the valve when a vacuum is formed in the cylinder and in the casing so as to cause the fluid under pressure to enter the casing and break the vacuum.

5. The combination in a drifting valve, of a casing arranged to be coupled to the steam passage of a cylinder and having a port arranged to be coupled to a steam supply pipe and having an enlarged threaded opening; an air valve casing screwed into the opening and having a small air port; a plunger mounted in said casing; a valve for controlling the passage of fluid under pressure to the casing; a lever pivotally mounted in the casing and extending through the steam valve and resting on the air plunger so that when a vacuum is formed in the cylinder of the casing the air valve will be raised and will cause the lever to actuate the steam valve to allow steam under pressure to enter the casing and the end of the cylinder to which it is connected.

In testimony whereof, I have signed my name to this specification, in the presence of two subscribing witnesses.

KENNETH RUSHTON.

Witnesses:
BLAIR M. REILEY,
IRVIN M. PFEIFFER.

Copies of this patent may be obtained for five cents each, by addressing the "Commissioner of Patents, Washington, D. C."